United States Patent [19]

Yamasoe

[11] Patent Number: 4,828,616
[45] Date of Patent: May 9, 1989

[54] SURFACE TREATMENT CHEMICAL FOR FORMING A HYDROPHILIC COATING

[75] Inventor: Katsuyoshi Yamasoe, Yotsukaido, Japan

[73] Assignee: Nippon Paint Co., Ltd., Japan

[21] Appl. No.: 90,372

[22] Filed: Aug. 28, 1987

[30] Foreign Application Priority Data

Aug. 28, 1986 [JP] Japan ................................. 61-202343

[51] Int. Cl.⁴ ............................................. C23C 22/00
[52] U.S. Cl. ............................. 106/14.13; 106/14.11; 106/14.15; 106/79; 106/80; 524/5; 524/10
[58] Field of Search ............... 106/14.11, 14.13, 14.15, 106/79, 80; 524/5, 10

[56] References Cited

U.S. PATENT DOCUMENTS

| | | | |
|---|---|---|---|
| 3,901,836 | 8/1975 | Kader | 106/14.13 |
| 4,341,878 | 7/1982 | Marcantonio et al. | 524/5 |
| 4,404,114 | 9/1983 | Mohr et al. | 106/14.15 |
| 4,503,907 | 3/1985 | Tanaka et al. | 524/598 |
| 4,588,025 | 5/1986 | Imai et al. | 165/133 |

*Primary Examiner*—Paul Lieberman
*Assistant Examiner*—Helene Kirschner
*Attorney, Agent, or Firm*—Wegner & Bretschneider

[57] ABSTRACT

An aqueous surface treatment composition for forming a hydrophilic coating comprising: (a) alkali metal silicate, (b) aminoalcohol, and (c) a water-soluble resin selected from the group consisting of a water-soluble nylon, a natural polysaccharide and a water-soluble, natural protein, and/or a water-soluble silane coupling agent. This aqueous surface treatment composition is used to form a hydrophilic coating on an aluminum surface having a corrosion-resistant coating layer. The hydrophilic coating prepared from this composition has good hydrophilic nature and corrosion resistance with substantially no unacceptable odor.

14 Claims, No Drawings

SURFACE TREATMENT CHEMICAL FOR FORMING A HYDROPHILIC COATING

BACKGROUND OF THE INVENTION

The present invention relates to an aqueous surface treatment chemical for aluminum surfaces, and a method of treating aluminum surfaces. More particularly it relates to an aqueous surface treatment chemical for forming coatings with good corrosion resistance and highly durable hydrophilic nature and also with no or extremely reduced odor on aluminum fins of heat exchangers and a method of treating them.

Aluminum and its alloys are light and have good workability and heat conductance, so that they are widely used for fins of heat exchangers. Recently more and more air conditioners have been used not only for cooling but also for warming or dehumidification.

However, it is observed that moisture tends to be condensed and deposited as water droplets on the fin surfaces of air conditioners during cooling operations. If the fin surface is water repellent, this condensed water tends to be deposited in a hemispherical form on the fin surface or forms bridges between the fins, preventing smooth air flow, which in turn increases resistance of air flow, thereby decreasing heat exchange efficiency.

In addition, although aluminum and its alloys are essentially excellent in corrosion resistance, it is likely that the condensed water remaining on the aluminum fin surfaces for a long period of time forms an oxygen concentration cell, and that contaminants such as nitrogen oxides $NO_x$ and sulfur oxides in the air are absorbed and concentrated in the condensed water, so that a hydration reaction and a corrosion reaction are accelerated. Those produced by the corrosion are accumulated on the aluminum fin surfaces, which not only deteriorate heat exchange characteristics, but also are blown out of the air conditioners as white fine powders together with a hot air during the warming operation in the winter.

To solve these problems, various attempts have been made to form on fin surfaces coatings for improving their corrosion resistance and for increasing their hydrophilic nature.

Such coatings are generally classified into inorganic coatings and organic coatings.

Proposed as a method for forming inorganic coatings is a method comprising forming a corrosion-resistant coating, for instance, by a chromate treatment, and dipping it in an aqueous solution mainly composed of silicon oxide and sodium oxide to form a hydrophilic coating (Japanese Patent Laid-Open No. 59-13078). However, despite the fact that such inorganic coating has good hydrophilic nature and corrosion resistance, it generates unpleasant odor peculiar to silica because it contains the silicates. And when it is used as pre-coated coil, the coating is cracked while cutting so that its corrosion resistance is reduced, and also severe tool wear takes place by cutting operation of such precoated aluminum plates.

Japanese Patent Laid-Open No. 58-80355 discloses a composition for forming a hydrophilic coating comprising (a) an alkali metal silicate having an $SiO_2/M_2O$ molar ratio of 2-5, (b) hydrophilic silicic acid or silicate fine powders, and (c) a silane coupling agent or an ortho ester of a transition element in Group IV of the Periodic Table or a derivative thereof. The coating prepared from this composition has excellent hydrophilic nature but it disadvantageously generates unacceptable odor.

On the other hand, as a method of forming organic coating, a method of forming a hydrophilic coating on an aluminum surface by applying an aqueous solution comprising water-soluble or water-dispersible, high-molecular resin and silica fine powders to the aluminum surface, and then heat-curing the coating was proposed (for instance, Japanese Patent Laid-Open No. 55-99976). However, since this coating contains silica fine powders, it suffers from cracking while cutting in the case of a precoated aluminum plate, leading to lower corrosion resistance. And tools are extremely worn during cutting operations and the coating has relatively poor hydrophilic nature. In addition, it causes air conditioners to release unacceptable if slight odor peculiar to silica.

Further, U.S. Pat. No. 4,503,907 discloses a heat exchanger coated with an aqueous coating composition comprising a plurality of spaced fins with narrow distance in parallel to form flow passages between fins and a plurality of heat transfer pipes passing through the fins, the both surfaces of the fins being coated with an aqueous coating composition comprising 100 parts by weight of a resin component for water paint in solid content, 5 to 95 parts by weight of a surface active agent and 5 to 65 parts by weight of synthetic silica and baked at a temperature of 120° C. to 200° C. for 10 to 40 minutes for curing to give a coating film of 3 to 20 μm, whereby the fins are provided with hydrophilic surfaces having excellent corrosion resistance and surface hardness. However, this coating composition also contains silica which causes the generation of unacceptable odor.

In addition, U.S. Pat. No. 4,588,025 discloses a heat exchanger made of aluminum and comprising a tube and fins attached to the tube, the heat exchanger being characterized in that the fins are treated with a coating composition comprising an alkali silicate, a low-molecular weight, organic compound having carbonyl group, and a water-soluble, high-molecular weght organic compound, and are thereafter dried by heating, whereby a hydrophilic coating is formed over the surfaces of the fins. This hydrophilic coating too releases unacceptable odor because of the silicate.

OBJECT AND SUMMARY OF THE INVENTION

An object of the present invention is, therefore, to provide an aqueous surface treatment chemical for forming a hydrophilic coating with excellent hydrophilic nature and corrosion resistance and with substantially no odor.

Another object of the present invention is to provide a method for forming a hydrophilic coating with such properties.

A further object of the present invention is to provide a bath for forming a hydrophilic coating on an aluminum surface.

In view of the above object, the inventors have found that odor is generated from the alkali metal silicate or silica contained in the hydrophilic coating, and that the addition of aminoalcohol and a particular water-soluble resin and/or a water-soluble silane coupling agent serves to provide a coating having good corrosion resistance and hydrophilic nature with substantially no odor. The present invention is based on this finding.

That is, the surface treatment chemical for forming hydrophilic coatings according to the present invention comprises (a) alkali metal silicate, (b) aminoalcohol, and (c) a water-soluble resin selected from the group consisting of a water-soluble nylon, a natural polysaccharide and a water-soluble, natural protein, and/or a water-soluble silane coupling agent.

The method of treating an aluminum surface according to the present invention comprises the steps of forming a corrosion-resistant coating on the aluminum surface and forming a hydrophilic coating thereon with an aqueous surface treatment chemical containing (a) alkali metal silicate, (b) aminoalcohol, and (c) a water-soluble resin selected from the group consisting of a water-soluble nylon, a natural polysaccharide and a water-soluble, natural protein, and/or a water-soluble silane coupling agent.

The bath for treating an aluminum surface according to the presetn invention comprises (a) alkali metal silicate, aminoalcohol, and (c) a water-soluble resin selected from a water-soluble nylon, a natural polysaccharide and a water-soluble, natural protein, and/or a water-soluble silane coupling agent.

DETAILED DESCRIPTION OF THE INVENTION

The alkali metal silicates used in the present invention are generally represented by the formula: $M_2SiO_3$ or $SiO_2 \cdot M_2O$, wherein M is an alkali metal. The alkali metals (M) may be one or more elements selected from lithium, sodium and potassium, and potassium is particularly preferable from the viewpoint of properties and costs. The molar ratio of $SiO_2$ to $M_2O$ is preferably 0.5–3. When $SiO_2/M_2O$ is less than 0.5, sufficient corrosion resistance cannot be obtained, and when it exceeds 3, odor suppressing effects are lowered. The aqueous surface treatment chemical of the present invention is usually used in the form of an aqueous solution, and the concentration of $SiO_2$ in the bath solution is 0.1–1.0 weight %. When the concentration of $SiO_2$ is less than 0.1 weight %, sufficient corrosion resistance cannot be provided, and when it exceeds 1.0 weight %, white powders are generated on thick portions of the resulting coatings, deteriorating the appearance of the coatings, despite their good hydrophilic nature and corrosion resistance.

As described above, the alkali metal silicates tend to generate peculiar odor when used for forming coatings of heat exchanger fins. This odor is strong particularly at the time of starting air conditioners and is gradually decreasing as the operation of air conditioners continues. The reason therefor has not been discovered yet, but it may be considered that odor materials adsorbed to the silanol (Si—OH) groups in the silicate coatings of heat exchangers during the stop period of air conditioners are freed as the air conditioners are operated, and blown out of them together with the air. Since the humidity on the surfaces of fins is extremely high during the operation of the air conditioners, causing moisture condensation, the odor materials adsorbed onto the fin coatings are replaced by condensed water molecules so that the odor becomes increasingly strong. Also, it is appreciated that the odor becomes stronger after repetition of operations, and this tendency appears to be caused by the phenomenon that moisture condensation on the fins of heat exchangers in air conditioners acts to dissolve alkali metals in the alkali metal silicate coatings, forming fine pores in the coatings, which in turn leads to expansion of the surface areas of the coatings having active silanol groups.

It has been found that aminoalcohol can greatly suppress the odor peculiar to these alkali metal silicate coatings. This mechanism is not necessarily clear, but it may be considered that since aminoalcohols have excellent film-forming properties, which means that it is capable of forming dense and stable coatings, alkali metal silicate coatings containing them suffer from substantially no dissolution of alkali metals even by immersion in hot water, hardly forming fine pores in the coatings which serve as adsorption sites of the odor materials. On the other hand, the coatings produced from surface treatment chemicals containing no aminoalcohol suffer from severe dissolution of alkali metals, so that they become porous, highly likely to cause adsorption and dissorption of the odor materials. In addition, even before immersion in hot water, the coatings formed from surface treatment chemicals containing aminoalcohol are much less likely to generate odor for the same reasons.

The aminoalcohols having such odor suppressing function are preferably those represented by the general formula:

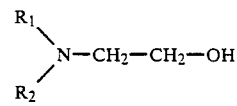

wherein $R_1$ and $R_2$ are H or alkyl or alkyl alcohol groups having 1–4 carbon atoms. When the number of carbon atoms is greater than 4, the hydrophobic groups become too large, resulting in undesirable decrease in the hydrophilic nature of aminoalcohols.

Aminoalcohols represented by the above general formula are, for instance, ethanolamine, N,N-dimethylethanolamine, N,N-diethylethanolamine, diethanolamine, N-methyldiethanolamine, triethanolamine, etc.

The concentration of aminoalcohol in the aqueous surface treatment chemical is preferably 0.5–5 weight %. When it is less than 0.5 weight %, sufficient odor suppressing effects cannot be obtained. However, even with more than 5 weight % of aminoalcohol, odor suppressing effects do not increase correspondingly to the increase of the aminoalcohol, thereby making it disadvantageous from the economic point of view to increase aminoalcohol more than 5 weight %. The more preferred concentration of aminoalcohol in the bath is 0.5–3 weight %.

The odor is greatly reduced by aminoalcohol, and it is further suppressed by the addition of a particular water-soluble resin and/or a water-soluble silane coupling agent.

The water-soluble resins which may be used should be water soluble by themselves and should not lose their hydrophilic nature by the reaction of their hydrophilic groups in the subsequent steps of baking and drying. The water-soluble resins contain at least one of a hydroxy group, a secondary amine group and a tertiary amine group. They are particularly water-soluble nylons, natural polysaccharides and water-soluble, natural proteins. The natural polysaccharides include water-soluble starch, carboxymethylcellulose, gum arabic, gum guaiac, sodium alginate, etc., and the water-soluble, natural proteins include gelatin, etc.

The water-soluble silane coupling agents function similarly to the above water-soluble resins. They should be stable in an alkaline aqueous solution, and those having the following general formula are particularly preferable.

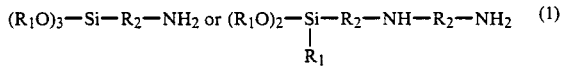

wherein $R_1$ is an alkyl group having 1-3 carbon atoms, and $R_2$ is an alkylene group having 1-3 carbon atoms.

Incidentally, when the number of carbon atoms in $R_1$ and $R_2$ is 4 or more, their hydrophilic nature is insufficient.

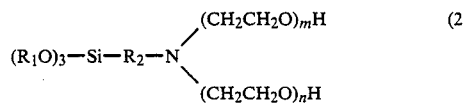

wherein $R_1$ is an alkyl group having 1-3 carbon atoms, $R_2$ is an alkylene group having 1-3 carbon atoms, and $m$ and $n$ are arbitrary integers.

Incidentally, when $m+n$ is less than 10, their hydrophilic nature is insufficient. Accordingly, $m+n$ is preferably 10 or more.

The silane coupling agents represented by the formula (1) include γ-aminopropyltriethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, etc., and particularly the last two compounds are preferable.

The silane coupling agents represented by the formula (2) include ethylene oxide addusts of trialkoxyl-ω-aminoalkylenesilane.

The amount of the above water-soluble resin and/or the water-soluble silane coupling agent added is 0.1-5 weight % based on the surface treatment bath. When it is less than 0.1 weight %, sufficient odor suppressing effects cannot be obtained, and when it exceeds 5 weight %, correspondingly increased effects cannot be expected, meaning that it is not economical to increase the water-soluble resin and/or the water-soluble silane coupling agent more than 5 weight %. The preferred amount of the water-soluble resin and/or the water-soluble silane coupling agent is 0.2-2 weight %.

The water-soluble resin and/or the water-soluble silane coupling agent is retained to some extent in the coating after drying heat exhchangers treated with the alkaline aqueous surface treatment chemical. That is, most of the water-soluble resin and/or the water-soluble silane coupling agent is dissolved away by dipping in cold or hot water, but a part thereof still remains adsorbed onto the alkali metal silicate coating layer. This remaining water-soluble resin and/or water-soluble silane coupling agent contributes to odor suppressing effects.

The surface treatment solution for forming hydrophilic coatings according to the present invention would have low pH by absorption of a carbon dioxide gas in the atmosphere, which undesirably leads to lower film-forming properties. Thus, the pH of the surface treatment solution should always be kept at 11-14. When the pH is lower than 11 sufficient odor suppressing effects cannot be obtained, and when it is higher than 14 the corrosion-resistant coating formed in advance tend to peel off. It is particularly preferable to maintain the pH of the surface treatment solution at 11.5-13.5. For this purpose, alkali hydroxides such as KOH. NaOH, LiOH, etc. are added in proper amounts.

The method of treating aluminum materials such as heat exchanger fins according to the present invention will be described in detail below.

Before treating with the aqueous surface treatment composition of the present invention, a corrosion-resistant coating layer is formed on an aluminum surface. The corrosion-resistant coating layer is preferably obtained by a chromate treatment. The chromate treatment may be carried out by using an aqueous solution comprising chromic acid, inorganic acid such as sulfuric acid, nitric acid, hydrofluoric acid, phosphoric acid, etc., and proper additives. It may be classfied into two categories; a phosphoric chromate treatment using phosphoric acid as an inorganic acid and a chromium chromate treatment using the other acids than phosphoric acid. The chromate treatment may be carried out by immersion of the aluminum material in a chromate treatment solution, or by spraying it with the treatment solution, but the immersion method is preferable for heat exchanger fins having complecated shapes. The Cr content in the corrosion-resistant coating layer obtained by the chromate treatment is 150-200 mg/m². Incidentally, before forming the corrosion-resistant coating layer, a degreasing treatment may be conducted if necessary.

The aluminum material formed with the corrosion-resistant coating layer is washed with water. Water washing is preferably carried out by rinsing it with running water for about 10-30 seconds.

After water rinsing, it is treated with the aqueous surface treatment chemical to form a hydrophilic coating. This treatment can be carried out by an immersion method, a spray method, a brushing method, etc., but the immersion method is most preferable for the above-mentioned reasons. The immersion method is carried out by immersing the aluminum material formed with the corrosion-resistant coating layer in the aqueous surface treatment chemical at 20°-70° C. for 0.5-5 minutes. After immersion, the aluminum material is dried at 150°-240° C. for 15-60 minutes to obtain the hydrophilic coating.

The present invention will be described in further detail by the following Examples.

EXAMPLES 1-10

Aluminum plates were degreased and then subjected to a phosphoric chromate treatment by an immersion method with Alodine 407/47 (tradename, manufactured by Nippon Paint Co., Ltd.) to form a corrosion-resistant coating having 150-200 mg/m₂ of Cr content. These chromate-treated aluminum plates were washed with running water for 20 seconds.

Each of the aluminum plates was then dipped in an alkaline surface treatment solution having the composition and pH shown in Table 1 under treatment conditions as shown in Table 1, and then dried at 200° C. for 30 minutes to form a hydrophilic coating. Each of the resulting hydrophilic coatings was tested with respect to odor, durability of hydrophilic nature and corrosion resistance. The test procedures and the evaluation standards of test results were as follows:

(1) Odor test

Each aluminum plate formed with a hydrophilic coating (hereinafter referred to simply as "sample") was dipped in warm water at 50° C. for 3 minutes, dried spontaneously, left to stand for one hour and then subjected to an odor test. The odor was classified as follows:

| Excellent: | No odor |
| Good: | Only slight odor |
| Fair: | Medium odor |
| Poor: | Strong odor |

Comparative Examples 1-3

Hydrophilic coatings were formed under the same conditions as in Examples 1-10 except for using alkaline aqueous surface treatment chemical containing no indespensable components such as aminoalcohols as shown in Table 1, and the same tests were carried out. The results are also shown in Table 2.

TABLE 1

| | Composition of Aqueous Surface Treatment Chemical | | | | | | | | | | |
|---|---|---|---|---|---|---|---|---|---|---|---|
| | $SiO_2$ | $M_2O$ | | Molar | Aminoalcohol | | Water-Soluble Resins, etc. | | | Treatment Conditions | |
| No. | wt. % | type | wt. % | Ratio (1) | Type | wt. % | Type | wt. % | PH | Temp. (°C.) | Time (sec.) |
| 1 | 0.5 | $K_2O$ | 0.4 | 1.95 | DMEA (2) | 2 | Water-Soluble Nylon | 1 | 12.0 | 60 | 60 |
| 2 | 0.5 | $K_2O$ | 0.4 | 1.95 | " | 2 | Gum arabic | 1 | 12.0 | 60 | 60 |
| 3 | 0.5 | $K_2O$ | 0.4 | 1.95 | " | 2 | APES (4) | 1 | 12.0 | 60 | 60 |
| 4 | 0.5 | $K_2O$ | 0.4 | 1.95 | " | 0.5 | APES (4) | 0.1 | 12.0 | 60 | 60 |
| 5 | 0.5 | $K_2O$ | 0.7 | 1.12 | " | 2 | Water-Soluble Nylon | 1 | 13.5 | 60 | 60 |
| 6 | 0.5 | $K_2O$ | 0.3 | 2.6 | " | 2 | Water-Soluble Nylon | 1 | 11.5 | 60 | 60 |
| 7 | 0.5 | $K_2O$ | 0.4 | 1.95 | " | 2 | Water-Soluble Nylon | 1 | 12.0 | 20 | 60 |
| 8 | 0.5 | $Na_2O$ | 0.4 | 1.95 | " | 2 | Water-Soluble Nylon | 1 | 12.0 | 60 | 60 |
| 9 | 0.5 | $K_2O$ | 0.4 | 1.95 | MDEA (3) | 2 | Water-Soluble Nylon | 1 | 12.0 | 60 | 60 |
| 1* | 0.5 | $K_2O$ | 0.4 | 1.95 | — | — | — | — | 12.0 | 60 | 60 |
| 2* | 0.5 | $K_2O$ | 0.4 | 1.95 | — | — | APES | 3 | 12.0 | 60 | 60 |
| 3* | 0.5 | $K_2O$ | 0.4 | 1.95 | — | — | Water-Soluble Nylon | 1 | 12.0 | 60 | 60 |

Note
*Comparative Example
(1): Molar ratio of $SiO_2/M_2O$
(2): N, N—dimethylethanolamine
(3): N—methyldiethanolamine
(4): N—($\beta$-aminoethyl)-$\gamma$-aminopropyltriethoxysilane

(2) Test of durability of hydrophilic nature

Each sample was subjected to five cycles of treatments, each of which consisted of leaving it in a saturated oleic acid vapor at room temperature for 16 hours, dipping it in water for 7 hours and drying it at 80° C. for 10 minutes. After that, 5 μl of deionized water was dropped onto a flat surface of each sample to measure contact angle Q of a water droplet. The contact angle Q was classified into the following categories:

| Excellent: | $Q \leq 5°$ |
| Good: | $5 < Q \leq 20°$ |
| Fair: | $20° < Q \leq 30°$ |
| Poor: | $30° < Q$ |

(3) Corrosion resistance test

According to JIS K 5400 7.6, each sample was immersed in a sodium chloride aqueous solution to measure the coating's resistance to salt water. The concentration of the sodium chloride aqueous solution was 3 w/v %, and the temperature thereof was about 20° C. And the immersion time was 300 hours. The evaluation was conducted by the following standards:

| Excellent: | No rust at all. |
| Good: | 2% or less of surface area suffering from white rust. |

The test results are shown in Table 2.

TABLE 2

| No. | Odor | Durability of Hydrophilic Nature | Corrosion Resistance |
|---|---|---|---|
| 1 | Excel. | Excel. | Excel. |
| 2 | " | " | " |
| 3 | " | " | " |
| 4 | Good | " | " |
| 5 | Excel. | " | " |
| 6 | " | " | " |
| 7 | " | " | " |
| 8 | " | " | " |
| 9 | " | " | " |
| 1* | Poor | " | " |
| 2* | Good | Poor | " |
| 3* | Fair | Good | " |

Note
*Comparative Example

As is apparent from the above results, the coatings prepared from the aqueous surface treatment chemical according to the present invention have highly durable hydrophilic nature and good corrosion resistance and also has extremely reduced odor.

As described above in detail, since the aqueous surface treatment chemical according to the present invention comprises alkali metal silicate, aminoalcohol and a particular water-soluble resin and/or a water-soluble silane coupling agent, it can provide coatings having excellent hydrophilic nature (highly durable hydrophilic nature) and good corrosion resistance, and also the resulting coating has extremely reduced odor. Since this hydrophilic coating is to be formed on heat exchangers for air conditioners, etc., it is extremely significant that the unacceptable odor can be prevented at the time of starting air conditioners. Further, since the aqueous surface treatment chemical of the present invention does not form bridges between fins of heat exchangers unlike conventional resin-type aqueous surface treatment composition, it is extremely suitable for heat exchangers.

The present invention has been explained by Examples, but it should be noted that it is not restricted thereto and that any modifications can be made unless they deviate from the scope of the present invention defined in the claims attached hereto.

What is claimed is:

1. An aqueous surface treatment composition for forming a hydrophilic coating on an aluminum heat exchanger comprising:
   (a) alkali metal silicate
   (b) at least about 0.5% aminoalcohol, and
   (c)
      (i) a water-soluable resin selected from the group consisting of nylon, a natural polysaccharide and a natural protein;
      (ii) a water-soluable silane coupling agent; or
      (iii) mixtures of said silane with anyone of the aforesaid resins;
   wherein said alkali metal silicate has a $SiO_2/M_2O$ molar ratio of 0.5–3 and the concentration of $SiO_2$ is 0.1–1.0 weight %.

2. The aqueous surface treatment composition for forming a hydrophilic coating according to claim 1, wherein the pH of said aqueous surface treatment composition is 11–14.

3. The aqueous surface treatment composition for forming a hydrophilic coating according to claim 1, wherein said aminoalcohol is represented by the following general formula:

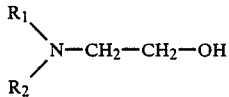

wherein $R_1$ and $R_2$ are H or alkyl or alkyl alcohol groups having 1 to 4 carbon atoms.

4. The aqueous surface treatment composition for forming a hydrophilic coating according to claim 1, wherein the concentration of aminoalcohol is 0.5–5.0 weight %.

5. The aqueous surface treatment composition for forming a hydrophilic coating according to claim 1, wherein said water-soluble resin contains at least one of a hydroxy group, and a secondary or tertiary amine group.

6. The aqueous surface treatment composition for forming a hydrophilic coating according to claim 1, wherein said water-soluble silane coupling agent is γ-aminopropylethoxysilane or N-(β-aminoethyl)-γ-aminopropyltriethoxysilane.

7. The aqueous surface treatment composition for forming a hydrophilic coating according to claim 1, wherein said water-soluble resin and/or said water-soluble silane coupling agent is 0.5–5 weight %.

8. A bath for treating an aluminum surface comprising
   (a) alkali metal silicate
   (b) at least about 0.5% aminoalcohol, and
   (c)
      (i) a water-soluble resin selected from the group consisting of nylon, a natural polysaccharide and a natural protein;
      (ii) a water-soluble silane coupling agent; or
      (iii) mixtures of said silane with anyone of the aforesaid resins;
   wherein said alkali metal silicate has a $SiO_2/M_2O$ molar ratio of 0.5–3 and the concentration of $SiO_2$ is 0.1–1.0 weight %.

9. The bath for treating an aluminum surface according to claim 8, wherein the pH of said aqueous surface treatment composition is 11–14.

10. The bath for treating an aluminum surface according to claim 8, wherein said aminoalcohol is represented by the general formula:

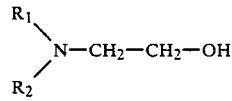

wherein $R_1$ and $R_2$ are H or alkyl or alkyl alcohol groups having 1-4 carbon atoms.

11. The bath for treating an aluminum surface according to claim 8, wherein the concentration of said aminoalcohol is 0.5–5.0 weight %.

12. The bath for treating an aluminum surface according to claim 8, wherein said water-soluble resin contains at least one of a hydroxy group and a secondary or tertiary amine group.

13. The bath for treating an aluminum surface according to claim 8, wherein said silane coupling agent is γ-aminopropyltriethoxysilane or N-(β-aminoethyl)-γ-aminopropyltriethoxysilane.

14. The bath for treating an aluminum surface according to claim 8, wherein said water-soluble resin and/or said water-soluble silane couplig agent is 0.1–5 weight %.

* * * * *